United States Patent Office 3,442,664
Patented May 6, 1969

3,442,664
TREATING COMPOSITION, METHOD OF TREATING AND TREATED SURFACES
Richard F. Heine, White Bear Lake, Minn., assignor to Minnesota Mining and Manufacturing Company, St. Paul, Minn., a corporation of Delaware
No Drawing. Filed Apr. 26, 1966, Ser. No. 545,294
Int. Cl. C09k 3/18; C09d 5/20
U.S. Cl. 106—2
10 Claims

ABSTRACT OF THE DISCLOSURE

An aircraft windshield treating composition containing a low molecular weight liquid polymeric fluorine containing hydrolytically stable organo-siloxane which when applied to an aircraft windshield provides a durable transparent water-repellent film on the windshield.

---

The present invention relates to a treating composition, the method of applying such composition and to a surface thus treated. More particularly, the invention relates to a fluorochemical composition for treating transparent surfaces to render the treated surface durably transparently hydrophobic.

A problem of long standing in the aircraft industry has been that of providing adequate visibility during rain. The problem has been greatly aggravated as aircraft speed has increased. Conventional windshield wipers were widely utilized for rain removal prior to the advent of high-speed jet aircraft. The inherent characteristics of the jet engine provided another means of removing rain water from the windshields of aircraft which consisted of blowing hot engine bleed air across the windshield. Both of these rain removal systems, however, suffer from certain disadvantages. Thus, although windshield wipers are quite effective in light to moderate rain and at low air speeds, they are inoperative in heavy rain and at high air speeds. Similarly, a jet blast system is not affected appreciably by rain intensity or air speed but is directly affected by engine power settings. Thus a jet blast system works well at high engine power settings but is ineffective at low engine power settings.

Other methods and materials utilized to combat the problem of poor visibility during rain have included lacquers, waxes and similar materials applied to the windshield surface. These ground-applied materials coat the surface with a film that decreases the surface energy of the windshield surface causing water to bead up and run off. The application of lacquer type materials to windshields is time consuming and the period of effectiveness of such coats is quite limited. Additionally, it is difficult to obtain a uniform coating on the windshield surface. The wax type repellents require previous preparation of the surface to assure adequate adhesion of the wax to the windshield; this preparation requires considerable rubbing of the surface and the resulting coating is effective only for short periods of time. A major disadvantage of any ground-applied repellent system is its total reliance on the predictability of need since the repellent cannot be applied to the aircraft windshield during flight. However, in view of the state of the meteorological art, the only practical way to assure availability of the repellent when needed has been to apply and maintain a rain repellent surface on aircraft windshields at all times. A complicating factor, even where the ground applied repellent system is maintained at all times is the fact that aircraft flight times frequently extend for longer periods than the relatively short effective life of these ground applied repellent systems.

A recently developed in-flight system utilizes a hydrolyzable silicone-titanate copolymer rain repellent. This hydrolyzable silicone-titanate copolymer in conjunction with Freon 113 as solvent in a self contained pre-pressurized system can be applied to an aircraft windshield during periods of actual rain to produce temporary periods, from 5 to 15 minutes, of rain repellency. The fluid reacts with the rain water to form an insoluble transparent hydrophobic film on the windshield. Rain water will then be drawn up into beads which cover only a portion of the windshield, the areas between the beads remaining dry and transparent. The beads of water are then readily removed by the high velocity slipstream across the windshield, providing good visibility. However, the very water-reactive nature of the silicone-titanate copolymer repellent, which is relied upon for operability, requires a complex and sophisticated dispensing system to prevent premature reaction of the repellent with water, even atmospheric moisture. Another problem encountered with the silicone-titanate system is the formation of an insoluble white milky residue if the repellent is applied to a dry windshield or in light rain or upon repeated applications in a moderate rain. The residue is formed because the film has the physical characteristic of adhering to itself resulting in a buildup of film layers which, at best, is translucent. This translucent film residue not only reduces visibility but also produces a dangerous landing light glare during night operations.

Hydrolyzable silicon compounds have long been used as glass treating agents; these compounds rely on the reaction of the hydrolyzable group with free or adsorbed water to provide for attachment of the molecules to the surface being treated. Such hydrolyzable compounds are not ordinarily storage stable, and some compounds are potentially corrosive in contact with water. As seen with the previously described hydrolyzable silicone-titanate treating composition, relatively elaborate water-free storage and application equipment is required.

It is, therefore, much to be desired to provide a storage-stable, non-corrosive rain water repellent system which can be simply and repeatedly applied to an aircraft windshield as and when required to provide adequate in-flight visibility.

Accordingly, an object of the present invention is to provide a new storage stable treating composition useful for applying a durable transparent water-repellent treatment to an aircraft windshield.

Another object of the invention is to provide an easily dispensible treating composition.

Another object of this invention is to provide a convenient and simple method for treating an aircraft windshield to render it water repellent.

Still another object is to provide a new treating composition which when applied to an aircraft windshield will provide a hydrophobic film which will remain transparent during periods of normal use and the effectiveness of which is not dependent on application conditions.

Various other objects and advantages will become apparent to those skilled in the art from the accompanying description and disclosure.

The new and useful treating composition of the present invention comprises an organic solution of low molecular weight liquid polymeric fluorine containing hydrolytically stable organo-siloxane, i.e., having a viscosity of from 500 cs. to 500,000 cs. at 25° C., typically with a wetting agent added thereto. While a solution of a single siloxane has been found to be extremely effective as a water repellent treatment for transparent windshield surfaces such as glass and plastic, certain mixtures of two component siloxnes have been found to be more effective than solutions containing either of the component siloxanes alone. The treating composition of this invention, for both economical reasons and for best results in treating a transparent surface to render it durably transparently hydrophobic, contains a maximum of about 5% siloxane solids by weight, preferably about 0.5 to 2% by weight, although it has been found that a mixture containing as little as 0.1% solids by weight performs satisfactorily as a rain repellent. The use of an organic solvent, preferably a non-flammable halogenated solvent, results in stable liquid which can be dispensed by air brought to pressure by pumps in the conventional manner without dehydration and applied during flight to give a clear film of significant duration. There is no danger that the composition will react with water to form an insoluble cloudy precipitate as with the prior art compositions since the constituent compounds are hydrolyzed fluorocarbon siloxanes and therefore water stable. The composition of the present invention also contains a dispersing or wetting agent, which serves to emulsify the treating composition in the rain water film and aids in uniformly distrbuting it over the windshield surface. This is a particularly desirable feature since the treating composition can thus conveniently be applied to an aircraft windshield by squirting the liquid at or near the leading edge of the windshield during flight.

The treating composition of the present invention can, of course, also be applied to an aircraft windshield during routine pre-flight preparations, although such ground applications are not normally contemplated nor necessary. In the event the treating composition is utilized as a ground applied repellent system, it has been found that the wetting agent can be omitted, and preferably should be, since the wetting agent would not be materially helpful when the composition is applied with a sponge or other suitable applicator to a dry windshield. In fact, the use of a wetting agent under such circumstances may result in the formation of a slight residue, which, however, is easily subsequently dissolved in water. It has been found that the solids content of the treating composition, when used as a ground applied repellent, should preferably be between about one-fourth to one-half the usual concentration of the composition as used in an in-flight system.

It is, of course, well known that fluorochemical compounds, when adhered to a surface, will render that surface both oleophobic and hydrophobic. It is also well known that certain perfluoroalkyl containing silicon compounds can be applied to a surface to provide a hydrophobic and oleophobic treated surface, e.g., see U.S. Patent No. 3,012,006. However, such prior art treatments were predicated upon the reaction of a hydrolyzable group attached to silicon, which, upon hydrolysis, generated an Si—O bond which became chemically linked to the surface. In contrast, the fluoroalkyl-containing silicon treating compounds of the present invention are hydrolytically stable siloxanes. Surprisingly, the —Si—O—Si—O—Si— grouping has sufficient adherence to the surface to provide a firmly bonded film of substantially monomolecular thickness, with the hydrophobic fluorocarbon "tail" outwardly oriented and exposed to the atmosphere. Repeated applications of the treating composition does not result in any substantial build-up of the monomolecular film.

As previously stated, the new and useful treating composition of the present invention comprises an organic solution of hydrolytically stable low molecular weight liquid polymeric fluorine-containing organo-siloxanes. The fluorine containing organo-siloxanes are prepared by aqueous hydrolysis of fluorocarbon silanes to provide the corresponding hydrolyzed product having repeating units of the structure $R_fZSi(R'')O$, where $R_f$ is a fluorinated hydrocarbon radical containing about 2–18 carbon atoms, preferably 4–12 carbon atoms; Z is a divalent linking radical such as —$SO_2N(R)R'$— or —$CON(R)R'$— in which R is hydrogen or a lower alkyl radical containing 1–4 carbon atoms and R' is alkylene, or —$(CH_2)_y$— where y is 1–18, or

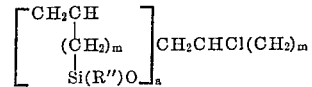

where $a$ is 0 or an integer up to and including about 10 and whose average value is preferably less than 5, and where $m$ is 0 to 18; R" is a lower alkyl radical containing 1–4 carbon atoms. Where the fluorinated radical contains only two carbon atoms, some water-repelling action is noted. Compounds wherein the fluorinated radical exceeds about 18 carbon atoms are economically less desirable and the hydrolysis products tend to be solids rather than liquids. Accordingly, the preferred compounds are those wherein the fluorinated radical contains about 4–12 carbon atoms. While a perfluoroalkyl group is preferred, the replacement of a small fraction, e.g., less than about 25%, of the fluorine atoms by atoms of H or Cl, particularly where the radical still contains a perfluoromethyl terminal group, does not seriously detract from the water-repellent properties. Inclusion of an O atom linking two fluorinated carbon atoms or an N atom linking three fluorinated carbon atoms does not materially alter the properties. While straight chain structures are generally preferred, alicyclic rings or occasional branching of the carbon chain produces only secondary effects. Mixtures of various structures or chain lengths are normally used since they are more readily available commercially and generally tend to improve the liquid range of the desired oily product.

In one preferred embodiment of the invention, the treating composition comprises a mixture of fluorocarbon siloxanes, at least one selected from the class herein designated A having the general formula consisting of repeating units of the structure $R_fQN(R)R'Si(R'')O$, wherein $R_f$ is a fluoroalkyl group of 2–18 carbon atoms, preferably 4–12 carbon atoms and in which carbon is substituted only by F, H and Cl groups and preferably contains a perfluoro group, R is H or a lower alkyl radical of 1–4 carbon atoms, R' is an alkylene group preferably containing 2–11 carbon atoms, R" is a lower alkyl radical of 1–4 carbon atoms and Q is —$SO_2$— or —CO—, and at least one selected from the class herein designated B having the general formula consisting of repeating units of the structure

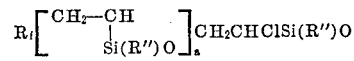

wherein $R_f$ is a fluoroalkyl group of 2–18 carbon atoms, preferably 4–12 carbon atoms and in which carbon is substituted only by F, H and Cl groups and preferably contains a perfluoro group, $a$ is an integer from 0 to 10 and R" is a lower alkyl radical of 1–4 carbon atoms.

It should be noted that a small proportion, i.e., about 10 mole percent, of the mixture could correspond to $R_fQSi(R'')_2X$ which will provide a monofunctional silanol which will act as a chain terminating group for these low molecular weight polymers in which formula $R_f$ Q and R" are as defined above and X is H, halogen or the radical —OR".

The fluorine containing siloxanes of the invention, obtained by the controlled hydrolysis, in accordance with well-known procedures, of the aforementioned fluorocarbon silanes of the formula $R_fQSi(R'')X_2$ are low molecular weight fluid polymers having a viscosity of from 500 cs. to 500,000 cs. at 25° C. While they comprise a mixture of cyclic and linear structures of varying molecular weight, the predominant materials are cyclic structures in which the units are joined by O—Si—O links, the average number of units in a particular molecule being from about 3 to 5.

In general, the utility of the siloxane products is not greatly affected by viscosity. Those products with a viscosity below about 500 centistokes tend to be volatile and provide a minimum durability; at viscosities above about 500,000 centistokes, spreading becomes slow and uneven treatment may result. For best results, a viscosity range of about 1,000 to 100,000 cs. is preferred.

Typical examples of repeating units of Class A fluorocarbon siloxanes which fulfill the requirements of the present treating compositions include:

$C_4F_9CONH(CH_2)_4Si(CH_3)O$
$C_8F_{17}SO_2N(C_2H_5)(CH_2)_3Si(CH_3)O$
$C_{12}F_{25}SO_2N(CH_3)(CH_2)_{11}Si(C_2H_5)O$
$(CF_3)_2CF(CF_2)_5CON(C_2H_5)(CH_2)_3Si(CH_3)O$
$C_4F_9CHFCF_2SO_2N(C_2H_5)(CH_2)_6Si(CH_3)O$
$C_4F_9CClFCF_2SO_2N(C_2H_5)(CH_2)_6Si(CH_3)O$

Typical examples of repeating units of Class B fluorocarbon siloxanes which fulfill the requirements of the present treating composition include:

$C_2F_5CH_2CHClSi(CH_3)O$
$C_4F_9CH_2CHClSi(CH_3)O$
$C_8F_{17}CH_2CHClSi(CH_3)O$
$C_8F_{17}CH_2CHClSi(C_2H_5)O$
$(CF_3)_2CF(CF_2)_6CH_2CHClSi(C_4H_9)O$
$O(CF(CF_3)CF_2)_2N(CF_2)_4CH_2CHClSi(CH_3)O$
$C_{12}F_{25}CH_2CHClSi(CH_3)O$

Since the treating composition of the present invention is designed for use on aircraft windshields, it is highly desirable, if not mandatory, to utilize nonflammable halogenated solvents, chlorinated solvents being preferred for reasons of economy. This fact dictates that the dispersing or wetting agent be soluble in such halogenated solvents.

It has been found that the composition of the treating solution is critical if a repellant of outstanding properties is to be obtained. Thus, use of a solution containing 1.5 weight percent of either fluorocarbon siloxane A or B resulted in a treatment which was highly water repellent but of relatively low durability. It has been found that the ratio of fluorocarbon siloxanes A to B in the preferred treating composition of the present invention can be varied from about 5:1 to about 1:5, the ratio of optimum operability being about 1:2.

The invention will be better understood by reference to the following examples which are merely illustrative and are not to be construed as unnecessarily limiting to the present invention.

EXAMPLE 1

Preparation of a fluorocarbon siloxane of Class A:
The starting fluorocarbon compound $$C_8F_{17}SO_2N(C_2H_5)Na$$

was prepared according to the teachings of U.S. Patent No. 2,803,615. 527 grams (1.0 mole) of this amide was charged into a 3-neck 3 liter flask equipped with a stirrer and total reflux condenser with one liter of ethylene glycol and heated to 100° C. 132 grams (1.1 mole) of allyl bromide was added over a two hour period with stirring. A temperature of 100 to 120° C. is maintained for 16 hours, after which the mixture is cooled to room temperature. The lower phase is separated and distilled. The clear liquid product which boils at from 100 to 120° C. at 2.0 mm. Hg contains 560 grams of the product $$C_8F_{17}SO_2N(C_2H_5)CH_2CH=CH_2$$

GLC[1] analysis indicated a yield of 92.3% of the allyl sulfonamide, 3.6% of the unreacted starting amide, with the remainder being minor impurities.

To a three liter flask equipped as before containing 900 grams (1.6 mole) of the above N-allyl-N-ethyl perfluorooctanesulfonamide in one liter of diisopropyl ether was added 290 grams (2.25 mole) of methyl dichlorosilane and 1 gram of a 5% Pt-on-carbon catalyst. This solution was stirred and refluxed for 16 hours at about 70° C., then cooled and filtered. Solvent and excess methyl dichlorosilane were removed under vacuum at room temperature to leave a white solid. This solid was analyzed and found to represent a 90% of theoretical yield of $C_8F_{17}SO_2N(C_2H_5)(CH_2)_3Si(CH_3)Cl_2$.

100 grams of this silane, $$C_8F_{17}SO_2N(C_2H_5)(CH_2)_3Si(CH_3)Cl_2$$

was dissolved in 100 ml. diethyl ether and added with stirring to 1000 ml. aqueous 5% hydrochloric acid, initially at 25° C., in a 3-liter flask equipped as before. After addition was complete, the mixture was refluxed briefly, the ether layer separated, and washed with dilute aqueous sodium bicarbonate. The ether was then removed under vacuum to leave a low molecular weight clear oily siloxane, the repeating unit of which is $$C_8F_{17}SO_2N(C_2H_5)(CH_2)_3Si(CH_3)O$$

with a viscosity of about 4,400 cs. at 25° C. By continuing heating of the residue at 100° C. and reduced pressure, the viscosity will gradually increase.

EXAMPLE 2

Preparation of a fluorocarbon siloxane of Class B:

Perfluorooctane sulfonyl chloride, $C_8F_{17}SO_2Cl$, was prepared according to the teachings of U.S. Patent No. 2,732,398. A mixture of 500 grams (1.0 mole) of perfluorooctane sulfonyl chloride, 220 grams (1.5 mole) of methyl vinyl dichlorosilane and 3.5 grams of azobisisobutyronitrile was stirred and heated in an oil bath to 79° C. over an hours time. Evolution of gas began at about 75° C. and the reaction became exothermic at 79° C. and rose to a temperature of 100° C. in twenty minutes. During this time, the bath temperature was maintained at 80° C. After the exotherm subsided, the bath was raised to 100° C. The reaction mixture was then distilled, removing first unreacted methyl vinyl dichlorosilane, then unreacted perfluorooctane sulfonyl chloride, under vacuum.

A fraction of the distillate, having a boiling point of 80° C. at 3.0 mm. to 130° C. at 0.01 mm. Hg was taken. GLC analysis indicated the approximated composition to be:

| | Percent |
|---|---|
| $C_8F_{17}SO_2Cl$ | 12.8 |
| $C_8F_{17}CH_2CHClSi(CH_3)Cl_2$ | 40.2 |
| $C_8F_{17}CH_2CHCH_2CHClSi(CH_3)Cl_2$ with $Si(CH_3)Cl_2$ branch | 38.1 |
| $C_8F_{17}\left[\begin{array}{c}CH_2CH\\ \vert \\ Si(CH_3)Cl_2\end{array}\right]_2 CH_2CHClSi(CH_3)Cl_2$ | 3.6 |

This material was hydrolyzed and further processed as in Example 1. The resultant product was a low molecular weight clear light amber liquid. The viscosity was about 4,100 cs. at 25° C.

The residual $C_8F_{17}SO_2Cl$, resulting from incomplete reaction during the preparation of the above free radical promoted addition is preferably removed almost completely during the first distillation. The remaining material is converted, during hydrolysis, to the corresponding water soluble sulfonic acid and is separated with the aqueous phase from the product siloxane.

In the specific preparation described above, approximately half of the product siloxane, $$\text{poly-}\left[C_8F_{18}\left[\begin{array}{c}CH_2-CH\\ \vert \\ Si(CH_3)O\end{array}\right]_a CH_2CHClSi(CH_3)O\right]$$

is represented by the first member, where $a=0$. The relative amounts of $a=0$; $a=1$; $a=2$, etc. depends upon the relative concentrations of sulfonyl chloride, the vinyl methyl dichloro silane, and the promoter. In general, the reaction should be carried out in such a manner, e.g., as low a concentration of vinyl methyl dichloro silane as is practical, as to maintain the relative amount of the first member of the series at a maximum. While the compounds ---
[1] Gas liquid chromatography.

represented by $a=2$ or more will provide satisfactory water-repellency, they will contribute to an increase in viscosity in the final product which will make uniform spreading of the treating solution more difficult.

EXAMPLE 3

An aircraft windshield treating solution is formulated by mixing the following ingredients, all parts being expressed as parts by weight:

0.5 part poly-$[C_8F_{17}SO_2N(C_2H_5)(CH_2)_3Si(CH_3)O]$ (fluorocarbon siloxane of Example 1)

1.0 part poly-$[C_8F_{17}CH_2CHClSi(CH_3)O]$ (fluorocarbon siloxane of Example 2)

1.0 part 75% solids solution in isopropanol of dicoco dimethyl ammonium chloride ("Arquad" 2C–75, a cationic wetting agent)

97.5 parts 1,1,1-trichloroethane ("Chloroethene NU")

The treating solution of Example 3 was tested on the windshield of an aircraft nose section mock-up in a wind tunnel with a simulated air speed of 120 knots and a rainfall of 2.8 inches per hour. Under those conditions, visibility through the windshield was negligible due to the presence of a continuous film of turbulent water thereon. The treating solution of Example 3 was applied to the leading edge of the windshield, propelled by air brought to pressure by an external pump. The solution was almost instantaneously dispersed over the windshield which immediately became hydrophobic and the rain beaded up and was blown away leaving large areas of dry glass. Visibility through the non-wet portions of the windshield was excellent, contrasting markedly with the blurred, opaque appearance created by the continuous film of turbulent water present on the windshield surface before application of the treating solution. This excellent visibility was undiminished after 10 minutes exposure to the above conditions with no additional treatment.

In contrast, when either compounds of Class A or B were used alone in amounts equivalent to A and B combined as in Example 3, with an amount of emulsifier equivalent to that in Example 3, good visibility was obtained, which, however, lasted only three minutes.

It is apparent from the results of these wind tunnel tests that the effect of a solution containing compounds of Class A and Class B together is unpredictably greater than the sum of the effect of treating solutions containing Class A and B compounds individually. In addition, the desirable characteristics of the treating solutions containing Class A or B compounds individually are retained in the mixture of Example 3. These desirable characteristics distinguish the solution of Example 3 over those liquid rain repellents found in the prior art. Thus, the only shortcoming inherent in the single compound fluorocarbon siloxane rain repellents, i.e., limited durability during heavy rain, is overcome while not sacrificing the demonstrated advantages of such individual fluorocarbon siloxanes over the prior art compounds, viz., excellent hydrophobicity, insensitivity to accidental contact with moisture and minimal visibility hampering translucent film formation when applied to a dry or slightly wet windshield. In addition, the treating solution of Example 3 will disperse and perform well in light rain; a serious drawback of the best of the prior art liquid rain repellents was its total ineffectiveness in light rain due to the formation of a translucent polymeric film.

An example of this latter situation is illustrated by the results of a test conducted on an aircraft windshield in flight. The aircraft was equipped so that each half of the windshield (actually two separate panes) could be treated independently, making it possible to compare two treating solutions simultaneously; additionally, a comparison of either test solution to an untreated windshied could be made. Such in-flight tests in light rain showed conclusively that compounds of either Class A or Class B performed better in dispersibility, in rain repellency and in durability to the best in-flight prior art liquid system, i.e., the silicone-titanate systems. A heavy rainfall is required to properly disperse the silicone-titanate repellent and achieve satisfactory properties.

We have disclosed a liquid rain repellent system which combines the best features of all the prior art systems without any of the serious limitations inherent in these earlier systems. Various alterations and modifications of the composition may be made and additional components may be used in the composition of the present invention, as will become apparent to those skilled in the art, without departing from the scope of the invention.

I claim:

1. A method of treating an aircraft windshield to render same transparently hydrophobic comprising applying thereto a composition comprising a halogenated organic solvent having dissolved therein a low molecular weight liquid polymeric fluorine containing hydrolytically stable organo-siloxane having repeating units of the structure $R_fZSi(R'')O$, wherein $R_f$ is a fluoroalkyl group of 2–18 carbon atoms; Z is (a)

$$-SO_2N(R)R'- \text{ or } -CON(R)R'-$$

in which R is H or a lower alkyl radical of 1–4 carbon atoms and R' is alkylene, or $-(CH_2)_y-$ where $y$ is 1–18; or (b)

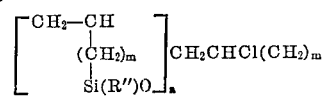

where $a$ is 0–10 and $m$ is 0–18, R'' is a lower alkyl radical of 1–4 carbon atoms, and a viscosity of from 500 cs. to 500,000 cs. at 25° C. whereby a durable transparently hydrophobic film of substantially monomolecular thickness is formed thereon.

2. The method according to claim 1 wherein the organo-siloxane is selected from the group having the general formula comprising repeating units of the structure $R_fQN(R)R'Si(R'')O$, wherein $R_f$ is a fluoroalkyl group of 2–18 carbon atoms and in which carbon is substituted only by F, H and Cl groups, R is H or a lower alkyl radical of 1–4 carbon atoms, R' is an alkylene radical of 2–11 carbon atoms, R'' is a lower alkyl radical of 1–4 carbon atoms and Q is $-SO_2-$ or $-CO-$, and the general formula comprising repeating units of the structure

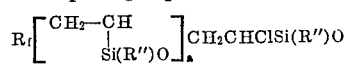

wherein $R_f$ is a fluoroalkyl group of 2–18 carbon atoms and in which carbon is substituted only by F, H and Cl groups, $a$ is an integer from 0 to 10 and R'' is a lower alkyl radical of 1–4 carbon atoms.

3. A method of treating an aircraft windshield to render same transparently hydrophobic comprising applying thereto a composition comprising a halogenated organic solvent having dissolved therein hydrolytically stable fluorocarbon siloxanes having a viscosity of 500 cs. to 500,000 cs. at 25° C., at least one selected from the class having the general formula comprising repeating units of the structure $R_fQN(R)R'Si(R'')O$, wherein $R_f$ is a fluoroalkyl group of 2–18 carbon atoms and in which carbon is substituted only by F, H and Cl groups, R is H or a lower alkyl radical of 1–4 carbon atoms, R' is an alkylene radical of 2–11 carbon atoms, R'' is a lower alkyl radical of 1–4 carbon atoms and Q is $-SO_2-$ or $-CO-$, and at least one selected from the class having the general formula comprising repeating units of the structure

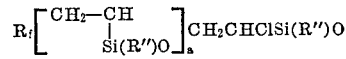

wherein $R_f$ is a fluoroalkyl group of 2–18 carbon atoms and in which carbon is substituted only by F, H and Cl groups, $a$ is an integer from 0 to 10 and R'' is a lower alkyl radical of 1–4 carbon atoms, in a weight ratio of about 5:1 to 1:5, dispersing said composition uniformly over said windshield and forming a durable transparently hydrophobic film of substantially monomolecular thickness thereon.

4. The method according to claim 3 wherein the composition comprises from 0.5 to 5 weight percent of a mixture of the fluorocarbon siloxanes

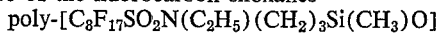
poly-[C$_8$F$_{17}$SO$_2$N(C$_2$H$_5$)(CH$_2$)$_3$Si(CH$_3$)O]
and

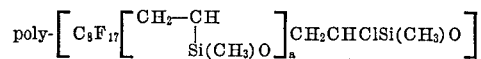
poly-$\left[ C_8F_{17}\left[\begin{array}{c}CH_2-CH\\ |\\ Si(CH_3)O\end{array}\right]_a CH_2CHClSi(CH_3)O \right]$ having a viscosity of 500 cs. to 500,000 cs. at 25° C. in a weight ratio of 1:2 dissolved in said halogenated organic solvent and a cationic wetting agent.

5. An aircraft windshield treating composition comprising a halogenated organic solvent having dissolved therein a liquid mixture of hydrolytically stable fluorocarbon siloxanes having a viscosity of 500 cs. to 500,000 cs. at 25° C., at least one selected from the class having the general formula comprising repeating units of the structure R$_f$QN(R)R'Si(R'')O, wherein R$_f$ is a fluoroalkyl group of 2–18 carbon atoms and in which carbon is substituted only by F, H and Cl groups, R is H or a lower alkyl radical of 1–4 carbon atoms, R' is an alkylene radical of 2–11 carbon atoms, R'' is a lower alkyl radical of 1–4 carbon atoms, and Q is —SO$_2$— or —CO—, and at least one selected from the class having the general formula comprising repeating units of the structure $R_f\left[\begin{array}{c}CH_2-CH\\ |\\ Si(R'')O\end{array}\right]_a CH_2CHClSi(R'')O$ wherein R$_f$ is a fluoroalkyl group of 2–18 carbon atoms and in which carbon is substituted only by F, H and Cl groups, $a$ is an integer from 0 to 10 and R'' is a lower alkyl radical of 1–4 carbon atoms, in a ratio of about 5:1 to 1:5.

6. The composition according to claim 5 wherein R$_f$ of the formulae is a perfluorinated organic radical containing 4–12 carbon atoms.

7. The composition according to claim 6 containing 0.5 to 5 weight percent siloxanes in a weight ratio of about 1:2 of

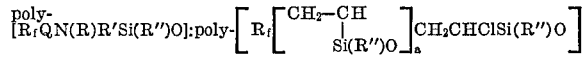
poly-[R$_f$QN(R)R'Si(R'')O]:poly-$\left[ R_f\left[\begin{array}{c}CH_2-CH\\ |\\ Si(R'')O\end{array}\right]_a CH_2CHClSi(R'')O \right]$ and additionally containing a cationic wetting agent.

8. The composition according to claim 7 containing 0.5 to 2 weight percent of the fluorocarbon siloxanes poly-[C$_8$F$_{17}$SO$_2$N(C$_2$H$_5$)(CH$_2$)$_3$Si(CH$_3$)O] and

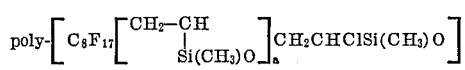
poly-$\left[ C_8F_{17}\left[\begin{array}{c}CH_2-CH\\ |\\ Si(CH_3)O\end{array}\right]_a CH_2CHClSi(CH_3)O \right]$ in a weight ratio of about 1:2.

9. An aircraft windshield having adsorbed thereon a durable transparently hydrophobic film of substantially monomolecular thickness of a composition comprising a halogenated organic solvent having dissolved therein a low molecular weight liquid polymeric fluorine containing hydrolytically stable organo-siloxane having repeating units of the structure R$_f$ZSi(R'')O, wherein R$_f$ is a fluoroalkyl group of 2–18 carbon atoms; Z is (a) —SO$_2$N(R)R'— or —CON(R)R'— in which R is H or a lower alkyl radical of 1–4 carbon atoms and R' is alkylene, or —(CH$_2$)$_y$— where $y$ is 1–18; or (b)

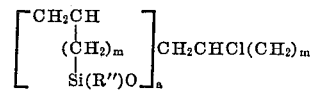
$\left[\begin{array}{c}CH_2CH\\ |\\ (CH_2)_m\\ |\\ Si(R'')O\end{array}\right]_a CH_2CHCl(CH_2)_m$ where $a$ is 0–10 and $m$ is 0–18, R'' is a lower alkyl radical of 1–4 carbon atoms; and a viscosity of from 500 cs. to 500,000 cs. at 25° C.

10. The treated aircraft windshield according to claim 9 wherein said treating composition comprises a liquid mixture of hydrolytically stable organo-siloxanes, at least one selected from the class having the general formula comprising repeating units of the structure

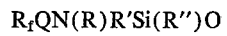
R$_f$QN(R)R'Si(R'')O wherein R$_f$ is a fluoroalkyl group of 2–18 carbon atoms and in which carbon is substituted only by F, H and Cl groups, R is H or a lower alkyl radical of 1–4 carbon atoms, R' is an alkylene radical of 2–11 carbon atoms, R'' is a lower alkyl radical of 1–4 carbon atoms and Q is —SO$_2$— or —CO—, and at least one selected from the class having the general formula comprising repeating units of the structure

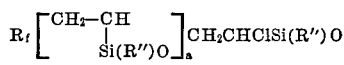
$R_f\left[\begin{array}{c}CH_2-CH\\ |\\ Si(R'')O\end{array}\right]_a CH_2CHClSi(R'')O$ wherein R$_f$ is a fluoroalkyl group of 2–18 carbon atoms and in which carbon is substituted only by F, H and Cl groups and R'' is a lower alkyl radical of 1–4 carbon atoms, in a ratio of about 5:1 to 1:5.

References Cited

UNITED STATES PATENTS

| | | | |
|---|---|---|---|
| 3,328,349 | 6/1967 | Lentz | 260—46.5 |
| 3,244,541 | 4/1966 | Fain et al. | 106—13 |
| 3,136,696 | 6/1964 | Harrison | 167—85 |

JULIUS FROME, *Primary Examiner.*

T. MORRIS, *Assistant Examiner.*

U.S. Cl. X.R.

106—13, 287; 117—124; 244—121; 252—70